United States Patent [19]
Konsky et al.

[11] Patent Number: 6,047,718
[45] Date of Patent: Apr. 11, 2000

[54] SOLENOID VALVE HAVING COAXIAL ARMATURES IN A SINGLE COIL DESIGN

[75] Inventors: Steven J. Konsky; John J. Love, both of St. Louis; Mike C. Santinanavat, Chesterfield, all of Mo.

[73] Assignee: EmersonElectric Co., St. Louis, Mo.

[21] Appl. No.: 09/283,467

[22] Filed: Apr. 1, 1999

[51] Int. Cl.[7] .................................................. F16K 31/06
[52] U.S. Cl. ...................... 137/1; 137/614.18; 137/628; 251/129.15; 335/265
[58] Field of Search .................. 251/129.15, 30.04; 137/614.11, 614.18, 628, 630.14, 630.22, 630.19, 1; 335/265

[56] References Cited

U.S. PATENT DOCUMENTS

| | | |
|---|---|---|
| 876,274 | 1/1908 | Kintner . |
| 2,223,986 | 12/1940 | Eaton . |
| 2,834,570 | 5/1958 | Harrison . |
| 2,983,286 | 5/1961 | Greenawalt et al. ............... 137/628 X |
| 3,494,376 | 2/1970 | Doeringsfeld et al. . |
| 3,727,836 | 4/1973 | Visos et al. . |
| 3,963,049 | 6/1976 | Beauregard ....................... 137/614.18 |
| 4,120,317 | 10/1978 | Skoyles . |
| 4,619,289 | 10/1986 | Tsuru et al. . |
| 5,199,456 | 4/1993 | Love et al. . |
| 5,218,996 | 6/1993 | Schmitt-Matzon . |
| 5,522,424 | 6/1996 | Dalton, Jr. et al. . |

*Primary Examiner*—Kevin Lee
*Attorney, Agent, or Firm*—Howell & Haferkamp, L.C.

[57] ABSTRACT

A solenoid valve having a coil, a pair of armatures including an inner armature slidable within a coaxial outer armature and the outer armature slidable within the coil, and a pair of valves. One of the valves is at or near the end of the outer armature extending from the coil, and the other valve is at or near an end of the inner armature extending from the valve-bearing end of the outer armature. Thus, both valves are at the same side of the solenoid valve assembly. When a magnetic force is applied by a current flowing in the coil, at least the inner armature is drawn in a direction into the coil so as to open the valve at its end. An increased magnetic field caused by increased current in the coil eventually results in the outer armature being drawn into the coil, thereby also opening the valve at the end of the outer armature. The valve is suitable for use in many fluid control applications, but is especially useful for control of gases and for control of intermittent gas ignition systems.

33 Claims, 4 Drawing Sheets

SOLENOID VALVE HAVING COAXIAL ARMATURES IN A SINGLE COIL DESIGN

BACKGROUND OF THE INVENTION

This invention relates to electromagnetically operated valves, and more particularly to an improved solenoid valve having coaxial armatures in which only one coil is necessary.

Three-way solenoid valves are known and have been used to control fluid flow, including gaseous fluid flow. For example, U.S. Pat. No. 5,218,996 discloses a solenoid valve having three operating positions for the purpose of rendering the system more efficient when regulating fluid pressure. The disclosed solenoid valve has inner and outer coaxial coils and first and second coaxial armatures. A first ball valve is secured to and movable with the first armature, and a second ball valve is secured to and movable with the second armature. A first compression spring urges the first armature downward into a position wherein the first ball valve normally closes an exhaust port. A second compression spring urges the second armature downward into a position wherein the ball valve is open. When one of the coils is energized, the first armature moves against the resistance of the first compression spring to open the first valve. The independent armatures allow only one of the valves to be open at a given time, but allows both valves to be closed at the same time.

U.S. Pat. No. 4,619,289 describes another solenoid-controlled valve that is said to be capable of achieving changeover and control at three positions by exciting only one particular solenoid. The solenoid has first and second coaxial armatures or members. The armatures are independently moveable along the axis via a solenoid coil.

While the previously known solenoid valves are useful for the purposes for which they are described, there is still a need for a valve having built-in sealing redundancy, which is particularly useful, desirable and required in low-pressure/high-pressure fluid applications.

BRIEF DESCRIPTION OF THE INVENTION

There is thus provided, in accordance with one aspect of the invention, a solenoid valve assembly comprising: a coil having a coil axis; a first armature and a second armature, the first and second armatures being moveable in first and second opposite directions along the coil axis and having valve coupling portions extending out of the coil in the first direction; a first valve and a second valve, the valve coupling portion of the first armature being operatively connected to a portion of the first valve in a manner so that movement of the first armature along the coil axis moves the first valve between open and closed positions, the valve coupling portion of the second armature being operatively connected to a portion of the second valve in a manner so that movement of the second armature along the coil axis moves the second valve between open and closed positions; and at least one of the first and the second armatures is responsive to a magnetic field generated by the coil. The armatures preferably comprise inner and outer armatures, which may be coaxial, and the inner armature is preferably free to slide inside the outer armature. The coil and the inner and outer armatures may be configured so that magnetic flux generated by the coil can selectively engage and disengage one or both of the armatures. The outer armature may be made of plastic or a non-magnetic material, and may be a hollow tube closed at an end opposite the valves. In this case, a first spring may be disposed between the inner armature and the closed end of the outer armature, the inner armature may be free to slide within the outer armature, and a second spring may be configured to bias the outer armature outward from the coil, wherein application of current to the coil causes a magnetic field generated by the coil to retract the inner armature inward towards the coil. The first spring may then be compressed until the outer armature is retracted inward towards the coil, or a member of the inner armature outside the outer armature may strike a member at the open end of the outer armature to thereby retract the outer armature inward, towards the coil.

In accordance with another aspect of the invention, there is provided a solenoid valve assembly comprising: a coil; a well slidable within the coil and having an open, first valve coupling portion extending out of the coil in a first direction and a closed end within the coil; a shaft slidable within the well and having a second valve coupling portion extending outside of the open, first valve coupling portion of the well; a first valve and a second valve, the first valve coupling portion operatively coupled to the first valve for opening and closing the valve and the second valve operatively coupled to the second valve coupling portion; a first spring configured to bias the well to close the first valve; and a second spring configured to bias the shaft to close the second valve; wherein the coil is configured to generate a magnetic force on at least one of the well and the shaft to oppose the bias force of the spring thereon. The open, first coupling portion of the well may be flanged, and an end of the well opposite the open end may be closed, with the second spring disposed inside the well. The first spring may be disposed outside the well. The shaft may be magnetic and the well nonmagnetic, and the second valve and well may be configured so that, when current is applied to the coil to generate a magnetic force, the second valve strikes the flange of the well. The shaft and the well may be configured to move as a unit thereafter in response to magnetic force from the coil.

In accordance with yet another aspect of the invention, there is provided a method for controlling flow of a fluid through a path comprising: magnetically operating a first valve on a portion of a first armature extending outward from a coil of a solenoid valve assembly to control the flow of fluid through the path, the coil having a coil axis; and operating a second valve on a portion of a second armature extending from the coil of the solenoid valve assembly to control the flow of fluid through the path; wherein the armatures are moveable along the axis of the coil in first and second opposite directions, and the outwardly-extending portions of both the first and the second armatures extend outward from the coil in the first direction. In this method, the first and the second armatures may be coaxial, and the step of operating the second valve may comprise either or both of compressing a biasing spring with the inner armature until the outer armature and inner armature move as a unit in the second direction or striking a flange on the outer armature with either or both of a portion of the inner armature or the first valve.

It is thus an object of this invention to provide an electromagnetically operated valve that provides redundant valve operation in a minimum of space.

It is a further object of this invention to provide an electromagnetically operated valve that can provide redundant valve operation with only one electromagnetic coil.

It is an additional object of this invention to provide a method of controlling a flow of fluid through a path employing coaxial valves and requiring only a single electromagnetic coil.

It is an additional object of this invention to provide an electromagnetically operated valve that is suitable for controlling gas flow in a device such as a gas furnace, a gas water heater, a gas space heater, a gas clothes dryer, a gas boiler, a gas-operated fireplace, or a gas cooking appliance, and other devices in which redundant valve operation may be advantageous.

The manner in which these and other objects of the invention are achieved will be apparent to one skilled in the art upon study of the figures and the accompanying description.

DETAILED DESCRIPTION OF THE INVENTION

Without intending any loss of generality, the devices and methods of this invention will be described in conjunction with gas fuel control valves, inasmuch as the invention is considered particularly advantageous when employed in such devices. It will be recognized, however, that the devices and methods of this invention may be applied more generally to various other fluids, both gaseous and liquid, and may be used advantageously to control the flow of such fluids in devices other than those that are described herein. In addition, where the discussion refers to control of a current flowing in a coil, it will be recognized that control of either current or voltage may be possible, with equivalent results.

Figure 1:
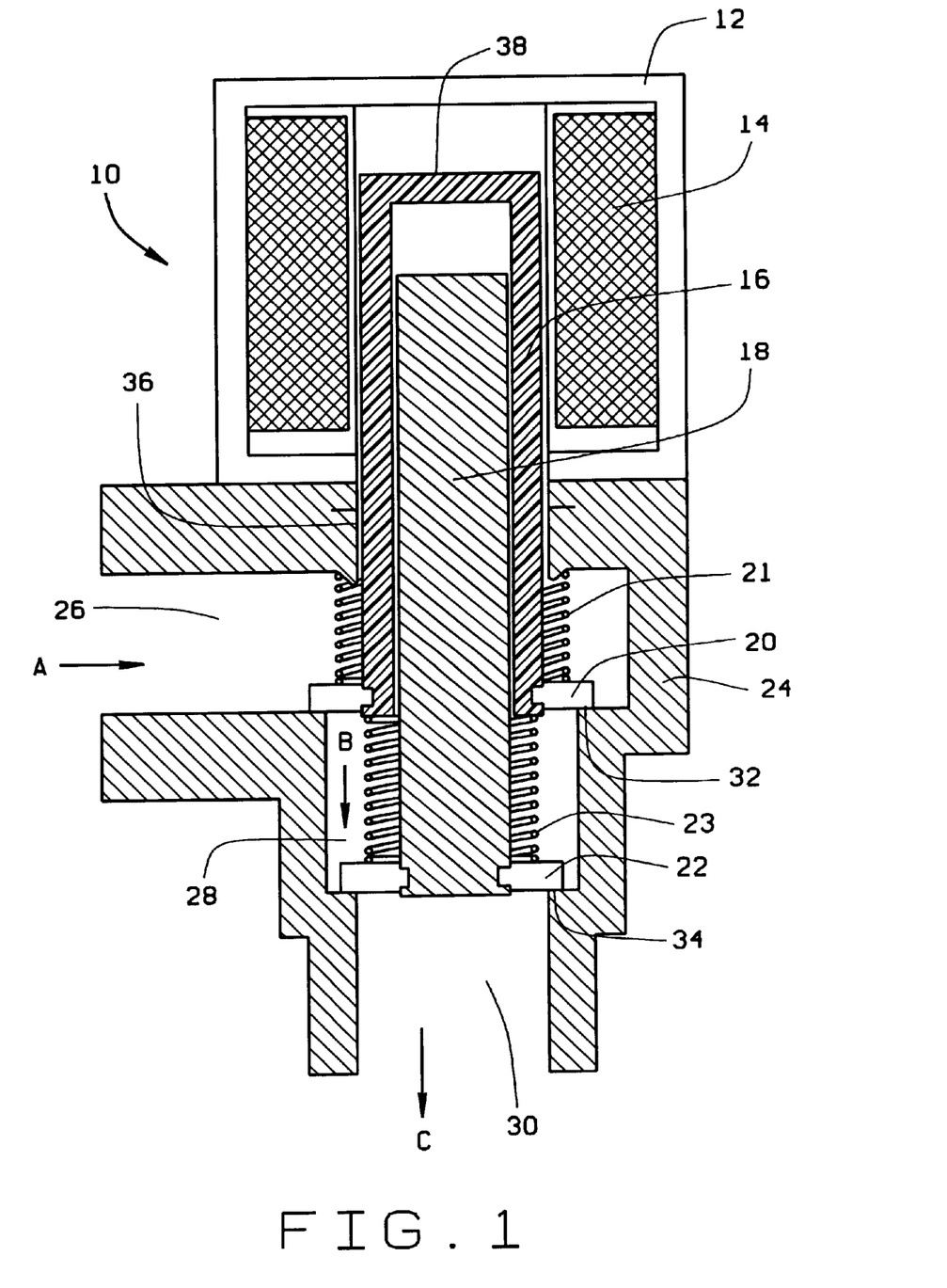
FIG. 1 is a cross-sectional view of a solenoid valve assembly of the present invention.

FIG. 1 is a cross-sectional view of a solenoid valve assembly 10 of the present invention. Valve assembly 10 comprises a coil 14, an outer armature 16, an inner armature 18, a first valve seal 20, and a second valve seal 22. A portion of outer armature 16 slidably surrounds inner armature 18, and is preferably coaxial therewith. A cover member 12 is provided over coil 14. Valve assembly 10 is mounted on a body 24 of a device such as a gas control valve. An inlet port 26 in body 24 is provided for the entry of gas.

Armatures 16 and 18 pass through a bore 36 in body 24. Inner armature 18 extends past the end of outer armature 16 through chamber 28, which connects with inlet 26. Inner armature 18 is free to slide inside outer armature 16, and outer armature 16 is free to slide inside coil 14. An outlet path 30 connects to chamber 28. First valve seal 20 at or near an end of outer armature 16 is biased by a spring 21 to rest on a first valve seat 32 (which may be a part of body 24) so that when coil 14 is not energized, flow of gas from inlet 26 to chamber 28 is prevented. Similarly, second valve seal 22 at the end of inner armature 18 extending beyond the end of outer armature 16 is biased by a spring 23 so that it rests on a second valve seat 34 to prevent flow of gas from chamber 28 to outlet 30.

Although spring 21 is shown here as providing a bias force between a portion of body 24 and valve seal 20, it is not necessary that the bias be provided directly to the valve seal 20. For example, the bias force could instead be provided to a flange on outer armature 16. Similarly, the bias force of spring 23 could be provided to a flange of inner armature 18 rather than directly to valve seal 22. However, unlike spring 21, which has one end stationarily compressed against a portion of body 24, spring 23 is compressed between valve seal 22 (or a flange on inner armature 18) and an end portion of outer armature 16.

In operation, when no current is applied to coil 14, valve seals 20 and 22 rest against their respective valve seats 32 and 34, shutting off flow of gas from inlet port 26 to chamber 28 and from chamber 28 to outlet path 30. To open these paths, current is applied to coil 14 to generate a magnetic field. This magnetic field can engage one or both of the armatures 16 and 18, depending upon the amount of current flowing in the coil (and hence, the strength of the magnetic field) and the relative spring constants of springs 21 and 23, for example. In the embodiment shown in FIG. 1, inner armature 18 is spaced from the sealed end 38 of outer armature 16 and outer armature 16 is spaced from cover member 12 when valve seals 20 and 22 are in the "off" position. Thus, valve seal 20 may disengage from valve seat 32 before valve seal 22 disengages from valve seat 34, or valve seal 22 may disengage from valve seat 34 before valve seal 20 disengages from valve seat 32, or both may disengage essentially simultaneously when sufficient current is applied to coil 14. When both are disengaged, gas flows into inlet port 26 as indicated by arrow A, into inner bore 28 as indicated by arrow B, and out through outlet path 30, as indicated by arrow C.

When current through coil 14 is reduced or removed and the magnetic field generated by the coil weakens, the bias forces of springs 21 and 23 act to cause outer armature 16 and inner armature 18 to slide outwardly from coil 14. Depending upon the balancing of the forces on inner armature 18 and outer armature 16, one or the other of valve seals 20 and 22 will come to rest first on their respective valve seats 32 and 34, or both valve seals will come to rest simultaneously. It will thus be seen that a redundant valve construction is achieved wherein two valves are provided in a small space, with a single coil efficiently used to supply an operating magnetic flux.

Figure 2:
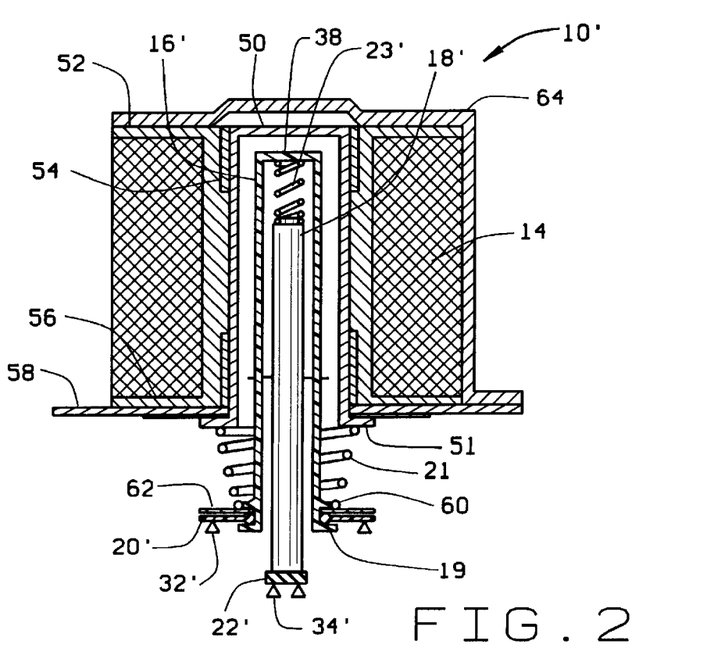
FIG. 2 is a cross-sectional view of another solenoid valve assembly of the present invention.

A cross sectional view of another solenoid valve assembly 10' of the present invention is shown in FIG. 2. This embodiment comprises a coil 14, a redundant shaft 16' and a main shaft 18'. Coil 14 is wound on a bobbin 52 with metallic sleeves 54. Redundant shaft 16' slides in a tube 50 inside bobbin 52 and sleeves 54. A gasket 56, plate 58, and coil bracket 64 are provided for mounting purposes. Coil bracket 64 may also advantageously shape and confine the magnetic field of coil 14.

Redundant shaft 16' (which need not be metal, and could be plastic or made of various other materials) is sealed at an end 38 inside tube 50, but is otherwise hollow. Main shaft 18', which is of a magnetic material that is attracted into the central tube 50 of coil 14 when coil 14 is energized, is slidably engaged within redundant shaft 16', but is biased away from end 38 of redundant shaft 16' by an internally mounted spring 23'. A redundant valve seal 20' is fixedly attached at or near an end of redundant shaft 16' opposite end 38. Preferably, a plate 62 is also affixed just behind redundant valve seal 20' by retaining ring 60, and end 19 of redundant shaft 16' is flanged to hold valve seal 20' in place. Spring 21 provides a bias to redundant shaft 16' to force redundant valve 20' to rest on redundant valve seat 32', which thereby is closed to the passage of fluid. In the embodiment illustrated, spring 21 is disposed around a portion of redundant shaft 16' extending outside of tube 50, and provides pressure between an outer flange 51 of tube 50 and plate 62 or retaining ring 60 behind plate 62. Other placements of spring 21 that provide bias for the closure of redundant valve 20' on redundant seat 32' may be used. In this position, spring 23' inside redundant shaft 16' biases main shaft 18' further outward, seating main valve 22' on main seat 34' somewhat beyond end 19 of redundant shaft 16'.

Figure 3:
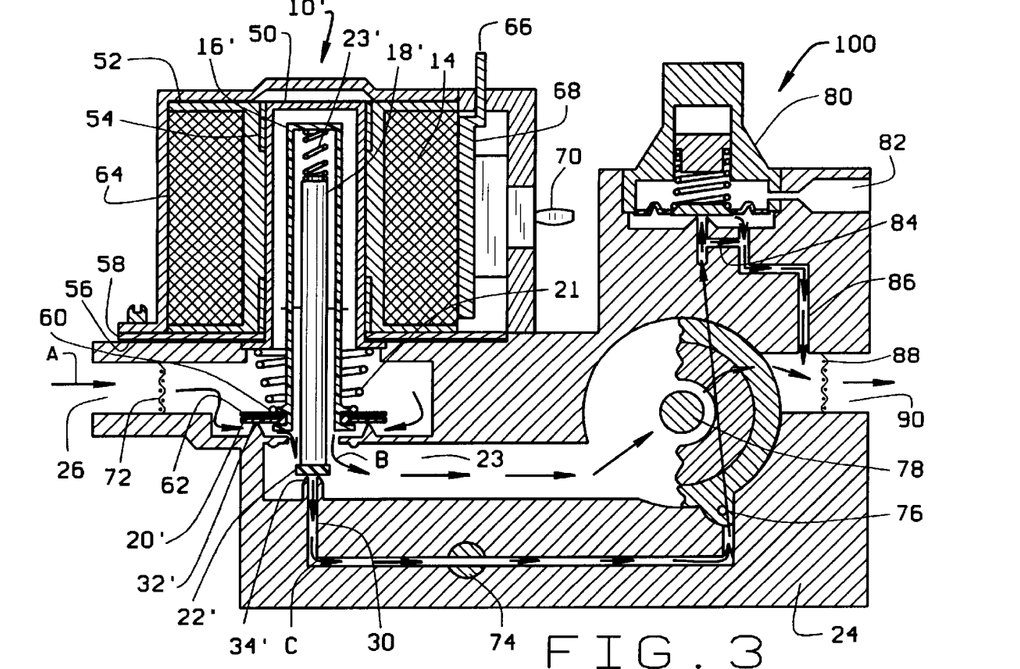
FIG. 3 is a schematic representation, in cross-section, of the solenoid valve assembly of FIG. 2 installed in a gas control valve.

When a sufficient amount of current passes through coil 14, a magnetic field is generated that pulls main shaft 18' into tube 50. This results in main valve 22' being lifted off of main seat 34', which thereby opens the main portion of the valve. As the main shaft 18' is lifted, spring 23' is compressed. As an increased amount of current passes through coil 14, the main shaft 18' is lifted sufficiently and spring 23' is compressed sufficiently to overcome the bias of spring 21 and to lift redundant shaft 16'. This causes redundant valve 20' to be lifted off redundant seat 32', opening the redundant valve. At a sufficiently large current, both valves are fully open. As current in coil 14 is reduced, the process proceeds in reverse, first seating redundant valve 20' on redundant seat 32', and next seating main valve 22' on main seat 34', thereby closing both valves. FIG. 3 is a schematic representation, in cross-section, of the solenoid valve assembly 10' of FIG. 2 installed in a gas control valve 100. A few additional details of assembly 10' are shown, including terminals 66 of coil 14, a printed circuit (PC) board 68, and a manual switch 70 that may be used to manually control current applied through terminals 66 to coil 14. Aside from solenoid valve assembly 10', gas control valve 100 also comprises a filter screen 72 at inlet 26 for removing debris particles that may be present in a flow of gas A, a control gas orifice 74, a diaphragm 76, a main regulator valve 78, a servo regulator 80, a regulator vent 82, a by-pass path 84, an outlet sense port 86, an outlet filter screen 88, and an outlet 90. Except for solenoid valve assembly 10', gas control valve 100 is similar to White-Rodgers 36E Combination Gas Control Valve available from White-Rogers Division, Emerson Electric Co., St. Louis, Mo. The interested reader is referred to U.S. Pat. No. 3,727,836 to Visos et al., directed to a manifold gas valve, which describes the operation of a regulator and diaphragm operator, and which is hereby incorporated by reference in its entirety. (U.S. Pat. No. 5,199,456 to Love et al. shows and describes solenoid constructions that have previously been used in gas control valves. The gas valve described in Love et al. has a moveable metallic plunger and a coaxially mounted stationary metallic core member, and may be contrasted with those of the invention.)

The reader is reminded once again that the figures are not necessarily drawn to scale. In the case of FIG. 3, it is particularly noted that the gap between redundant shaft 16' and tube 50 is exaggerated, and should preferably be about 0.010 inch. The gap between the main shaft 18' and the redundant shaft 16' is also preferably 0.010 inch. By comparison, redundant valve 20' and redundant seat 32' may typically separate in operation by as much as 0.250 inch. Of course, while these gaps and separations may be typical and/or preferred, these and other dimensions of the solenoid valve itself may be adjusted as necessary for different applications.

Figure 4:
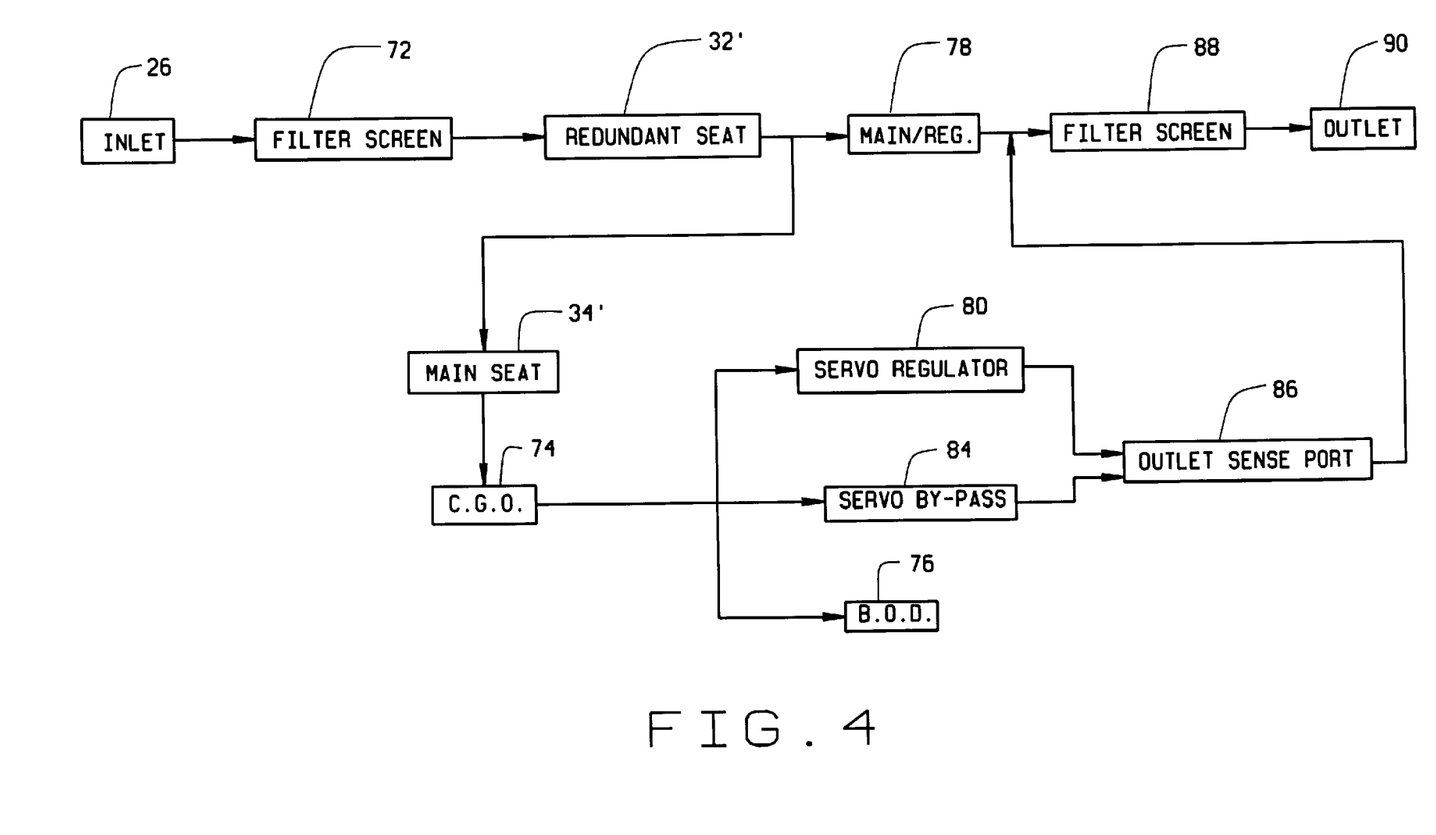
FIG. 4 is a flow block diagram of the structure of FIG. 3.

FIG. 4 is a flow block diagram of the structure of FIG. 3. Gas enters at inlet 26 and passes through filter screen 72. When redundant valve 20' is lifted from redundant seat 32', gas flows through the redundant valve and is divided into two flows. One of these flows passes through the main/regulator valve 78, the filter screen 88, and outlet 90. When main seat 34' and main valve 22' are open, the other flow is directed through the main valve, past the control gas orifice 74, and to the back of diaphragm 76, to servo regulator 80 and servo by-pass 84. The flows of servo regulator 80 and to servo by-pass 84 are then reunited at outlet sense port 86 and this second flow rejoins the first to pass through filter screen 88.

Figure 5:
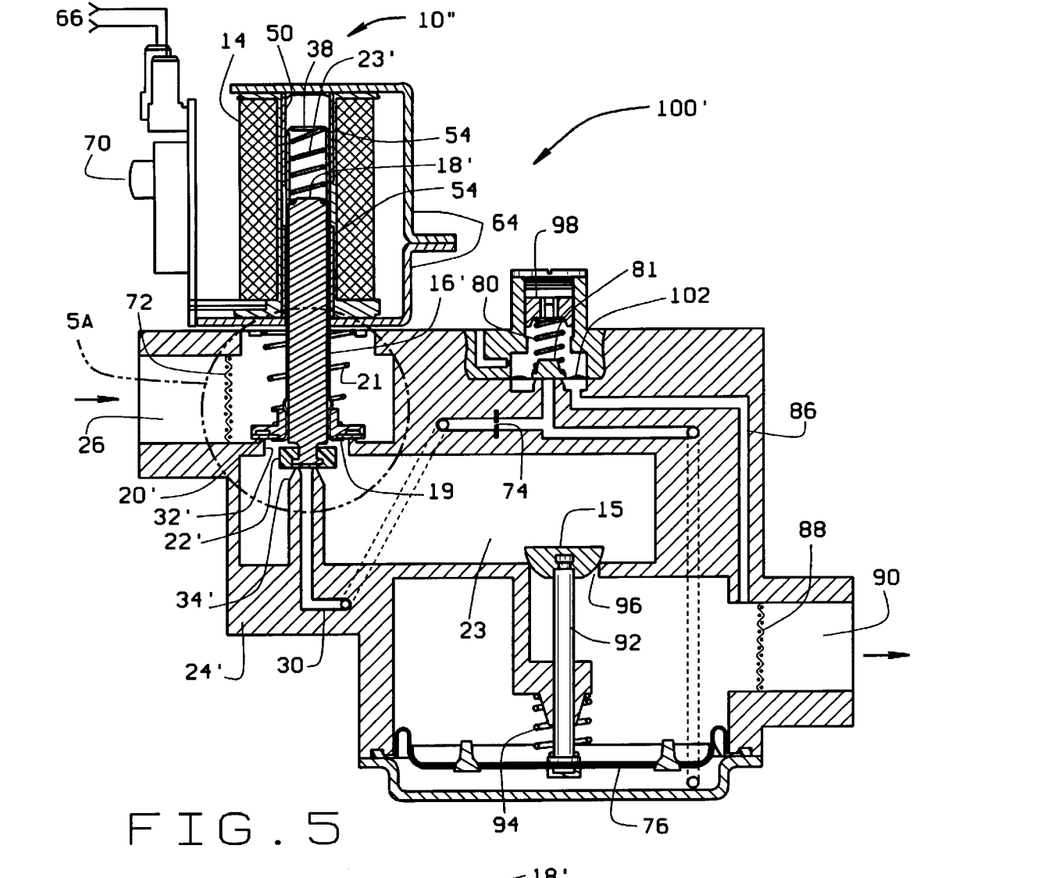
FIG. 5 is a schematic representation, in cross-section, of a control valve incorporating yet another solenoid valve assembly of the present invention.

FIG. 5 is a schematic representation, in cross-section, of a control valve 100' incorporating yet another solenoid valve assembly 10" of the present invention. Except for solenoid valve assembly 10" and modifications made in body 24' to accommodate assembly 10", the remainder of the construction of control valve 100' is similar to the White-Rodgers 36E Combination Gas Control Valve discussed above.

When an appropriate AC voltage is supplied by a controller (such as a thermostat, which is not shown in FIG. 5) and when manual switch 70 is in the "on" position, built-in rectifier circuitry (not shown) supplies rectified DC current to coil winding 14. The current through coil 14 generates a magnetic field that is concentrated and shaped by coil brackets 64 and sleeves 54 to provide an operating force on shaft 18'. This magnetic force is sufficient to override the main return spring 23', which provides a biasing force on shaft 18' in an opposite direction to the magnetic field, which pulls shaft 18' into coil 14. Shaft 18' slides within redundant shaft or well 16' (which may be non-magnetic) and moves towards the closed end 38 of redundant shaft 16'. This movement lifts the main valve 22' off its seat 34', thereby opening a gas path 30 and compressing main return spring 23' until main valve 22' strikes flanged end 19 of redundant shaft 16'

Figure 5A:
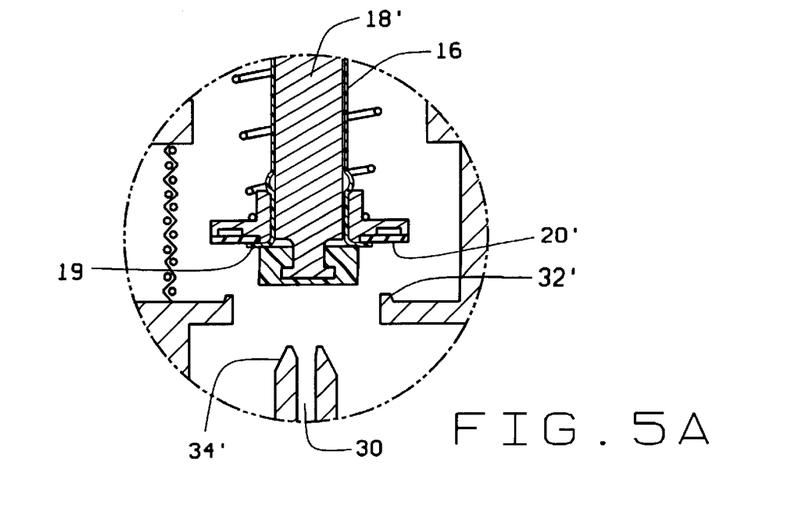
FIG. 5A is an enlarged, fragmented, cross-sectional view showing ends of inner and outer armatures of the solenoid control valve of FIG. 5.

The impact force of main valve 22' striking the flanged end 19 of redundant shaft 16' combines with the magnetic force provided by coil 14 to override the biasing force of "redundant" return spring 21 and inlet gas pressure, thereby lifting redundant valve 20' off its seat 32'. (See FIG. 5A, which shows both valves in their open state) Main shaft 18' and redundant shaft 16' continue to move as a unit within the non-magnetic closed end tube 50 until the magnetic and spring forces reach equilibrium wherein both valves are open, thus allowing high capacity flow of gas from inlet 26 to the inner chamber 23. Gas flow to the outlet is momentarily blocked by regulator valve 15. The pressure differential between the inlet and the outlet causes gas to flow through the open path 30 to the control gas orifice 74. The limited amount of gas coming through the control gas orifice 74 is split into two paths, one going to the servo diaphragm 81 and one going to the back of the regulator diaphragm 76. Pressure differential caused by the gas going to the back of the regulator diaphragm 76 forces the diaphragm to flex, pushing against regulator shaft 92. This force overrides the regulator spring 94 and the regulator shaft 92 lifts the regulator valve 15 off its seat 96, allowing high capacity regulated flow from the inner chamber 23 to outlet 90.

As long as appropriate current is supplied, the forces on the solenoid shaft 18' remain in equilibrium and high capacity flow is allowed from inlet 26 to the inner chamber 23. Gas flow to outlet 90 is regulated by a balance of pressures. This balance is adjustable and controlled by the regulator spring 80. The biasing force of spring 80 is adjusted by turning the regulator adjust screw 98. This force controls the amount of gas allowed to flow past the servo regulator seat 102 and into the gas path 86 leading to outlet 90. The balance of pressure caused by this adjustment controls the position of the regulator diaphragm 76, which in turn controls the position of the regulator valve 15. The position of this valve relative to its seat 96 controls the flow of gas from inlet 26 to outlet 90. The effect of fluctuations in the inlet pressure within the specified range of operation are damped and effectively eliminated by this system. The inlet filter 72 and the outlet filter 88 prevent particles from entering the valve and interfering with proper operation.

When current to the valve coil 14 is interrupted, either by the controller (e.g., the thermostat interrupts AC voltage) or by turning off the manual switch 70, the magnetic field collapses. The force equilibrium that holds the main 22' and redundant 20' valves off their seats 34' and 32' respectively is eliminated and return springs 23' and 21 force the valves closed. Closing redundancy is achieved by the independent closing of the two valves 20' and 22', the closing of either of which is separately capable of shutting off the gas flow. Redundant valve 20' directly shuts off the gas flow by closing against its seat 32'. Main valve 22' indirectly shuts off the gas flow by closing the gas path 30. A bleed or servo by-pass across the servo regulator seat 102 (actually, a small slot in diaphragm 81) allows the pressure in the back of regulator diaphragm 76 to equalize with the outlet 90 pressure. This allows the regulator spring 94 to return the regulator diaphragm 76 to its original position, closing regulator valve 15.

A difference between the solenoid valve assembly 10'' shown in FIG. 5 and assembly 10' shown in FIG. 3 is the structure by which the outer armature is lifted by upward movement of the inner armature. In the solenoid valve assembly of FIG. 3, as spring 23' is depressed, main valve 22' is lifted off main valve seat 34', opening the main valve. As spring 23' is depressed more, redundant valve 20' is eventually moved off its seat 32' by redundant armature 16'. In the structure of FIG. 5, inner shaft or armature 18' moves upwardly, lifting its valve 22' off seat 34'. As the inner armature 18' continues to move upwardly, its valve 22' impacts flanged end 19 of outer or redundant armature 16'. This impact and the continued upward movement of shaft 18' causes shaft 18' to lift redundant valve 20' off its seat 32'.

It will thus be seen that the solenoid valve constructions of this invention having a single coil with co-axial armatures and a valve on each armature at the same side of the solenoid valve is useful to provide a redundant valve construction in a smaller space than previously known for structures having similar function. Two mechanically independent valves may be provided in a small space, both of which are supplied with an operating flux from a single coil. Those skilled in the art will recognize that the inventive solenoid valves of this invention may be useful in many applications and for control of many different types of fluids, and are especially useful for control of gaseous fuel flow. Inasmuch as many modifications within the spirit of the invention will be apparent to those skilled in the art, the scope of the invention should be determined by reference to the claims appended below and the full scope of equivalents as provided by applicable laws.

What is claimed is:

1. A solenoid valve assembly comprising:

a coil having a coil axis;

a first armature and a second armature, the first and second armatures being axially moveable in first and second opposite directions along the coil axis and having valve coupling portions extending out of the coil in the first direction;

a first valve and a second valve, the first valve having a first valve moveable portion and a first valve seat, the first valve moveable portion being spaced from the first valve seat when the first valve is in an open position, the first valve moveable portion being seated against the first valve seat when the first valve is in a closed position, the second valve having a second valve moveable portion and a second valve seat, the second valve moveable portion being spaced from the second valve seat when the second valve is in an open position, the second valve moveable portion being seated against the second valve seat when the second valve is in a closed position, the second valve seat being independent of the first valve seat, the valve coupling portion of the first armature being operatively connected to the first valve moveable portion in a manner so that movement of the first armature along the coil axis moves the first valve between open and closed positions, the valve coupling portion of the second armature being operatively connected to the second valve moveable portion in a manner so that movement of the second armature along the coil axis moves the second valve between open and closed positions; and at least one of the first and the second armatures is responsive to a magnetic field generated by the coil.

2. The solenoid valve assembly of claim 1 wherein the first and second armatures are coaxially configured.

3. The solenoid valve assembly of claim 1 wherein the second armature is an inner armature, the first armature is an outer armature partially enclosing the inner armature, and the inner armature is free to slide inside the outer armature.

4. The solenoid valve assembly of claim 3 wherein the coil and the inner and outer armatures are configured so that magnetic flux generated by the coil can selectively engage one or both of the inner and outer armatures.

5. The solenoid valve assembly of claim 4 wherein the coil and the inner and outer armatures are further configured so that, after both the inner and the outer armatures are engaged by the magnetic flux of the coil, a reduction in the magnetic flux generated by the coil can selectively disengage one or both of the inner and outer armatures.

6. The solenoid valve assembly of claim 3 wherein the coil and the inner and outer armatures are configured so that, after both the inner and outer armatures are engaged by magnetic flux generated by the coil, a reduction in the magnetic flux generated by the coil can selectively disengage one or both of the inner and outer armatures.

7. The solenoid valve assembly of claim 3 wherein the outer armature is formed of a plastic material.

8. A gas furnace having the solenoid valve assembly of claim 1 operatively controlling gas flow in the gas furnace.

9. A gas water heater having the solenoid valve assembly of claim 1 operatively controlling gas flow in the gas water heater.

10. A gas space heater having the solenoid valve assembly of claim 1 operatively controlling gas flow in the gas space heater.

11. A gas clothes dryer having the solenoid valve assembly of claim 1 operatively controlling gas flow in the gas clothes dryer.

12. A gas boiler having the solenoid valve assembly of claim 1 operatively controlling gas flow in the gas boiler.

13. A gas-operated fireplace having the solenoid valve assembly of claim 1 operatively controlling gas flow in the gas-operated fireplace.

14. A gas cooking appliance having the solenoid valve assembly of claim 1 operatively controlling gas flow in the gas cooking appliance.

15. The solenoid valve assembly of claim 1 wherein the first valve seat is axially spaced from the second valve seat.

16. The solenoid valve assembly of claim 1 wherein the first armature and first valve are configured so that the first valve moves from its closed position to its open position upon movement of the first armature in the first direction along the coil axis, and wherein the second armature and second valve are configured so that the second valve moves from its closed position to its open position upon movement of the second armature in the first direction along the coil axis.

17. A solenoid valve assembly comprising:
   a coil;
   a well slidable within the coil and having an open, first valve coupling portion extending out of the coil in a first direction and a closed end within the coil;
   a shaft slidable within the well and having a second valve coupling portion extending outside of the open, first valve coupling portion of the well;
   a first valve and a second valve, the first valve coupling portion operatively coupled to the first valve for opening and closing the valve and the second valve operatively coupled to the second valve coupling portion;
   a first spring configured to bias the well to close the first valve; and
   a second spring configured to bias the shaft to close the second valve;
   wherein the coil is configured to generate a magnetic force on at least one of the well and the shaft to oppose the bias force of the spring thereon.

18. The solenoid valve assembly of claim 17, wherein the open, first valve coupling portion of the well is flanged.

19. The solenoid valve assembly of claim 18, wherein an end of the well opposite the first, coupling portion is closed, and the second spring is inside the well.

20. The solenoid valve assembly of claim 19, wherein the first spring is outside of the well.

21. The solenoid valve assembly of claim 20, wherein the shaft is magnetic and the well is nonmagnetic, and second valve and the well are configured so that, when current is applied to the coil to generate a magnetic force, the second valve strikes the flange of the well.

22. The solenoid valve assembly of claim 21 wherein the shaft and well are configured to move as a unit in response to magnetic force from the coil after the second valve strikes the flanged end of the well.

23. The solenoid valve assembly of claim 22 further comprising at least one magnetic field shaping member configured to concentrate and shape a magnetic field generated by the coil to provide an operating force on the shaft.

24. The solenoid valve assembly of claim 23 wherein the at least one magnetic field shaping member is disposed between the shaft and the coil.

25. The solenoid valve assembly of claim 24 wherein the at least one magnetic field shaping member comprises solenoid brackets and sleeves.

26. The solenoid valve assembly of claim 17, wherein the shaft and the well are configured so that, when current is applied to the coil to generate a magnetic force, the shaft compresses the second spring to thereby retract the well in a direction towards the coil and open the first valve.

27. The solenoid valve assembly of claim 17 operatively configured to control a flow of ignitable gas.

28. A method for controlling flow of fluid through at least one path with a solenoid valve assembly having an electromagnetic coil, a first armature, and a second armature,
   the first armature having a first valve on a portion of the first armature extending outward from the coil, and the second armature having a second valve on a portion of the second armature extending from the coil, the first valve having a first valve moveable portion and a first valve seat, the first valve moveable portion being spaced from the first valve seat when the first valve is in an open position, the first valve moveable portion being seated against the first valve seat when the first valve is in a closed position, the second valve having a second valve moveable portion and a second valve seat, the second valve moveable portion being spaced from the second valve seat when the second valve is in an open position, the second valve moveable portion being seated against the second valve seat when the second valve is in a closed position, the second valve seat being independent of the first valve seat,
   the first and second armature being movable along an axis of the coil in first and second opposite directions, and the outwardly extending portions of both the first and the second armatures extending outward from the coil in the first direction,
   the method comprising:
      magnetically moving the first armature in one of the first and second directions to cause the first valve to move to its open position; and
      moving the second armature in said one of the first and second directions to cause the second valve to move to its open position.

29. The method of claim 28 wherein moving the first valve controls fluid flow through a first path and wherein moving the second valve controls fluid flow through a second path, the second path being different than the first path.

30. A solenoid valve assembly comprising:
   a coil having a coil axis;
   a first armature and a second armature, the first and second armatures being moveable in first and second opposite directions along the coil axis and having valve coupling portions extending out of the coil in the first direction, the second armature being an inner armature, the first armature being a non-magnetic outer armature partially enclosing the inner armature, the outer armature being a hollow tube having an open end extending out of the coil and a closed end opposite the open end, the inner armature having an end slidable within the outer armature;
   a first valve and a second valve, the valve coupling portion of the outer armature being operatively connected to a portion of the first valve in a manner so that movement of the outer armature along the coil axis moves the first valve between open and closed positions, the valve coupling portion of the inner armature being operatively connected to a portion of the second valve in a manner so that movement of the second inner along the coil axis moves the second valve between open and closed positions;
   a first spring disposed between the closed end of the outer armature and the end of the inner armature within the outer armature; and
   a second spring configured to bias a portion of the outer armature outward from the coil;
   and further wherein the coil and the first and the second springs are configured so that a magnetic field generated in response to a current flowing in the coil retracts the inner armature in a direction towards the coil, compressing the first spring until the outer armature also retracts in a direction towards the coil.

31. A solenoid valve assembly comprising:

a coil having a coil axis;

an inner armature and an outer armature partially enclosing the inner armature, the outer and inner armatures being moveable in first and second opposite directions along the coil axis and having valve coupling portions extending out of the coil in the first direction, the inner armature being free to slide inside the outer armature and having an end slidable within the outer armature, the outer armature being a non-magnetic, hollow tube having an open end extending out of the coil and a closed end opposite the open end;

a first valve and a second valve, the valve coupling portion of the outer armature being operatively connected to a portion of the first valve in a manner so that movement of the outer armature along the coil axis moves the first valve between open and closed positions, the valve coupling portion of the inner armature being operatively connected to a portion of the second valve in a manner so that movement of the inner armature along the coil axis moves the second valve between open and closed positions;

a first spring disposed between the closed end of the outer armature and the end of the inner armature within the outer armature; and a second spring configured to bias a portion of the outer armature outward from the coil;

and further wherein the coil and the first and the second springs are configured so that a magnetic field generated in response to a current flowing in the coil retracts the inner armature in a direction towards the coil, compressing the first spring until a member on a portion of the inner armature extending beyond the outer armature strikes a member on a portion of the outer armature extending outside of the coil, thereby retracting the outer armature in a direction towards the coil.

32. A solenoid valve assembly comprising:

a coil having a coil axis;

a first armature and a second armature, the first and second armatures being moveable in first and second opposite directions along the coil axis and having valve coupling portions extending out of the coil in the first direction;

a first valve and a second valve, the valve coupling portion of the first armature being operatively connected to a portion of the first valve in a manner so that movement of the first armature along the coil axis moves the first valve between open and closed positions, the valve coupling portion of the second armature being operatively connected to a portion of the second valve in a manner so that movement of the second armature along the coil axis moves the second valve between open and closed positions; and at least one of the first and the second armatures is responsive to a magnetic field generated by the coil, the second armature is an inner armature, the first armature is an outer armature partially enclosing the inner armature, and the inner armature is free to slide inside the outer armature.

33. The solenoid valve assembly of claim 32 wherein the outer armature is nonmagnetic.

* * * * *